United States Patent
Pflug et al.

(10) Patent No.: US 11,861,036 B1
(45) Date of Patent: Jan. 2, 2024

(54) SYSTEMS AND METHODS FOR MANAGING PRIVATE INFORMATION

(71) Applicant: United Services Automobile Association (USAA), San Antonio, TX (US)

(72) Inventors: David John Pflug, San Antonio, TX (US); Jansey Comeaux, Youngsville, LA (US); Irvin Lee Smith, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1057 days.

(21) Appl. No.: 16/561,666

(22) Filed: Sep. 5, 2019

Related U.S. Application Data (60) Provisional application No. 62/732,914, filed on Sep. 18, 2018.

(51) Int. Cl.
| | |
|---|---|
| *G06F 21/62* | (2013.01) |
| *G06F 21/60* | (2013.01) |
| *G06V 10/70* | (2022.01) |
| *G06F 16/9538* | (2019.01) |
| *G06F 16/9536* | (2019.01) |
| *G06Q 30/0203* | (2023.01) |
| *G06V 30/41* | (2022.01) |
| *G06V 30/19* | (2022.01) |

(52) U.S. Cl.
CPC ...... *G06F 21/6245* (2013.01); *G06F 16/9536* (2019.01); *G06F 16/9538* (2019.01); *G06F 21/60* (2013.01); *G06Q 30/0203* (2013.01); *G06V 10/70* (2022.01); *G06V 30/41* (2022.01); *G06V 30/19* (2022.01)

(58) Field of Classification Search
None
See application file for complete search history.

(56) References Cited

U.S. PATENT DOCUMENTS

| | | | | |
|---|---|---|---|---|
| 9,055,097 | B1* | 6/2015 | Foster | H04L 63/1433 |
| 11,062,036 | B2* | 7/2021 | Youssefi | G06F 21/602 |
| 2013/0340089 | A1* | 12/2013 | Steinberg | H04L 63/0227 726/27 |
| 2014/0007255 | A1* | 1/2014 | Altaf | H04L 63/10 726/27 |
| 2014/0282977 | A1* | 9/2014 | Madhu | H04L 63/1408 726/7 |
| 2017/0251013 | A1* | 8/2017 | Kirti | H04L 63/1441 |
| 2018/0262524 | A1* | 9/2018 | Deshpande | H04L 63/1441 |

* cited by examiner

*Primary Examiner* — Christopher J Fibbi
(74) *Attorney, Agent, or Firm* — Fletcher Yoder, P.C.

(57) ABSTRACT

The present disclosure relates to methods and systems for measuring private information protection across a number of external services. A centralized private information protection service is coupled to external services, accesses data of these external services, aggregates the data and determines a private information protection scoring based upon the aggregated data.

20 Claims, 8 Drawing Sheets

SYSTEMS AND METHODS FOR MANAGING PRIVATE INFORMATION

CROSS-REFERENCES TO RELATED APPLICATIONS

The present disclosure is related to, and claims priority to, U.S. Provisional Patent Application Ser. No. 62/732,914, titled "SYSTEMS AND METHODS FOR MANAGING PRIVATE INFORMATION," which was filed on Sep. 18, 2018, which is herein incorporated by reference in its entirety for all purposes.

BACKGROUND

The present disclosure relates generally to methods and systems to facilitate managing private data (e.g., personal identifying information). More specifically, the methods and systems described herein relate to safeguarding private data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

The Internet has brought about a connected world, where information is easily shared and/or used. To facilitate this connected environment, tremendous amounts of personally-identifying data (e.g., hard-copy (paper) data and/or electronic data) are generated. Unfortunately, oftentimes, this information is not properly secured, resulting in vulnerabilities that nefarious actors can take advantage of. For example, such bad actors may use information to impersonate individuals to commit fraud or perform other bad acts. Oftentimes, individuals may be unaware of potential avenues of data capture for these nefarious actors, especially as these bad actors become increasingly sophisticated and private information becomes more valuable.

SUMMARY OF THE INVENTION

Embodiments of this disclosure include systems and methods for informing and/or remediating potential avenues of nefarious capture of private data. In particular, the current techniques relate to an electronic service offering that is communicatively coupled to other systems where potential data breaches may occur. Upon analysis of the connected systems, automatic remediation events may be implemented, automatic notification events may be implemented, and/or an overall private data score may be generated, indicating a level of security for an individual's private data. The overall private data score may be used to provide notifications to the individual, enabling the individual to see how safe their private data is (e.g., in comparison to other individuals). Further, the private data score may be used to alter product/service offerings and/or costs associated with the service offerings.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, certain features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

While only certain features of the disclosure have been illustrated and described herein, many modifications and changes will occur to those skilled in the art. For example, while the embodiments described herein include a specific logic organization for private information protection services, substantially similar benefits provided by the present invention may be obtained by trivial structural alterations such as changes in name or in non-substantial changes to the mode of operation of the data structures. It is, thus, to be understood that the appended claims are intended to cover all such modifications and changes as fall within the true spirit of the invention.

Figure 1:
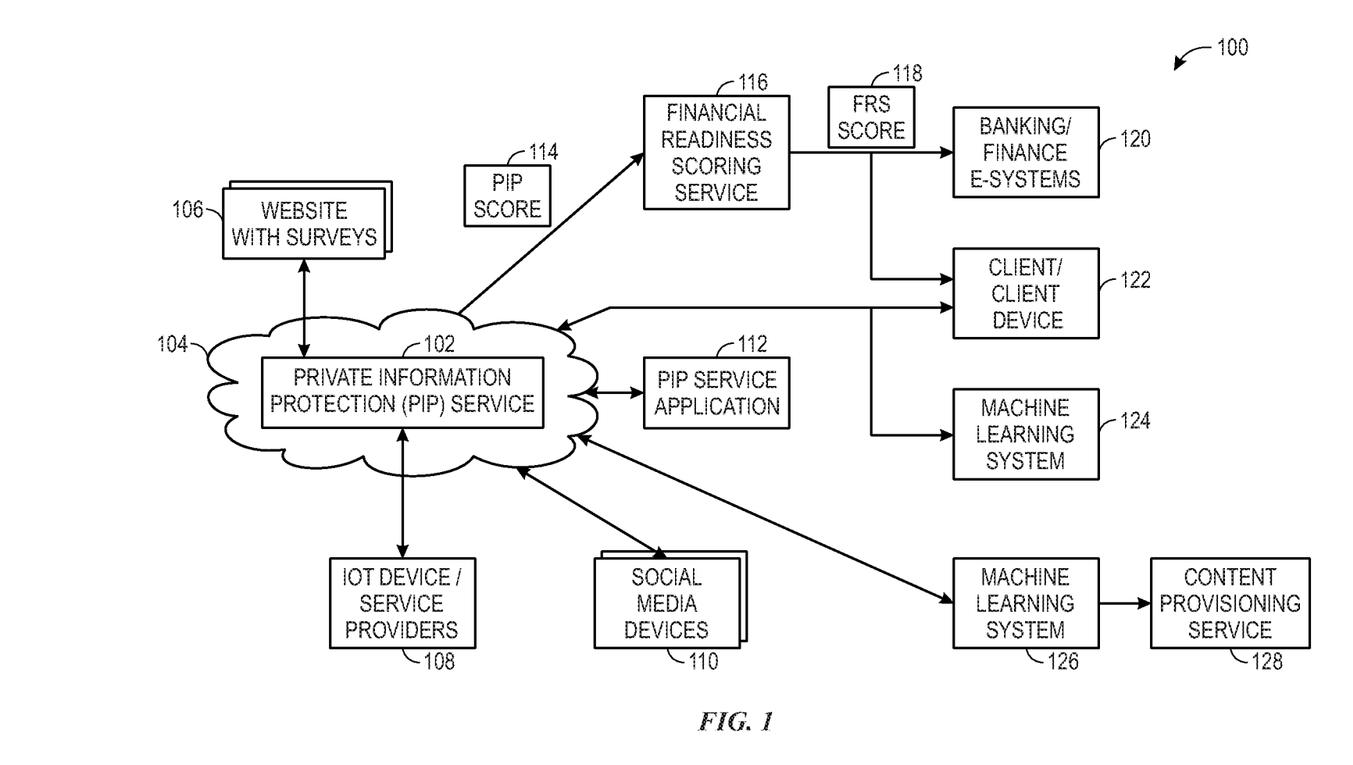
FIG. 1 is a block diagram, illustrating a system for private information management, in accordance with embodiments of the present disclosure.

Turning first to a discussion of an overall system for private data protection, FIG. 1 is a block diagram, illustrating a system 100 for private information management, in accordance with embodiments of the present disclosure. The system 100 includes a private information protection (PIP) service 102 that is communicatively coupled to a variety of devices and/or service providers (e.g., via the Internet 104). For example, in the current embodiment, the PIP service 102 is communicatively coupled to one or more web servers 106 that serve websites that include private information surveys. The private information surveys include questions geared towards particular individuals to ascertain particular characteristics of the individual's and/or group's (such as a family's) private data handling practices. Additionally, the PIP service 102, in the current embodiment, is communicatively coupled to "Internet of Things" (IOT) devices and/or IOT device service providers 108. IOT devices are common objects, such as televisions, appliances, etc. that are embedded with computing devices for interconnection via the Internet 104, enabling them to send and receive data. IOT device service providers provide electronic services that make use of data sent and/or received by the IOT devices. In many instances, IOT service providers act as a mediator between IOT devices, thus having access to many individual IOT device settings and data metrics. As used herein, IOT devices may also include items that facilitate Internet communications, such as network routers, switches, and/or other local area network (LAN) devices. The PIP service 102 may also be connected to social media services 110. Social media services 110 include interactive computer-mediated technologies that facilitate the creation and sharing of information, ideas, career interests and other forms of expression via virtual communities. The PIP service 102 may also be communicatively coupled to a PIP service application 112, which may execute on a remote electronic device to capture additional data. Each of the systems coupled to the PIP service 102 may provide data useful for an analysis of an individual's and/or a group of individuals' private data protection. The PIP service 104 may retrieve information from these systems, aggregate the data, and determine, via PIP data analysis, how protected the individual's and/or the group of individuals' data is.

Based upon the PIP analysis, a PIP score 114 indicative of a measure of how protected private information is may be generated. For example, factors used in the PIP analysis may result in a determination of a level of private information disclosure which may be represented in a PIP score 114. As mentioned above, the PIP score 114 may impact product/service offerings and/or costs associated with such products/services. For example, the PIP score 114 may be provided to a financial readiness scoring (FRS) service 116. The FRS service score 118 may indicate a level of financial aptitude of an individual and/or group of individuals. As may be appreciated, the individual's and/or group of individuals' private data protection or lack thereof may positively or negatively affect financial aptitude. For example, less protected private information may result in more financial fraud. Accordingly, the FRS score 118 may be reduced for lower PIP scores 114. Conversely, more protected private information may result in less financial fraud. Accordingly, the FRS score 118 may be increased for higher PIP scores 114. The FRS scores 118 may be provided to banking and/or finance electronic systems 120, after modifying the FRS score 118 to account for the PIP score 114. This enables the banking and/or financial electronic systems 120 to make educated product/service offerings and/or product/service price adjustments based upon a level of protection of private data. This provides a significant benefit over former techniques, which did not have access to such information for use in product/service offerings.

In some embodiments, the PIP score 114 and/or the FRS score 118 may be provided to the individual and/or group of individuals via, for example, a client device 122. For example, the PIP score 114 and/or the FRS score 118 may be provided as a numerical indication of where in a range of values the individual measures up for private information protection and/or financial readiness, respectively. By using numerical scores, individuals and/or groups of individuals may become quickly apprised of a standing amongst others with relatively little effort. Further, lower numerical scores may motivate positive change in private information protection and/or financial readiness actions, driving increased growth in these areas. Further, high numerical scores may motivate persistence in already positive private information protection and/or financial readiness actions.

In some embodiments, the PIP service 102 may be communicatively coupled to a remedial management service 124. Using information acquired by the PIP service 102, the remedial management service 124 may automatically institute remedial measures. For example, the PIP service 102 may, through PIP analysis, identify that private information is easily accessible by public users on the social media services 110 and, therefore, is unprotected. The PIP service 102 may provide information to the remedial management service 124, which may communicate with the social media services 110 (e.g., via an application programming interface (API)), to control private information settings within the social media services 110. While the remedial management service 124 is shown as a service separate from the PIP service 102, in some embodiments, these services are combined as one service.

In some embodiments, a machine-learning system 126 may be coupled with the PIP service 102 to derive additional information from data acquired by the PIP service 102. For example, as will be discussed in more detail below, the machine learning system 126 may be used to identify relevant groups of individuals that may act in common ways with regard to protection of private data (or lack thereof). For example, in one embodiment, the machine learning system 126 may identify a previously unknown group, such as enlisted servicemen and particular PIP activities associated with this group of individuals, such as an indication that they share deployment dates online publically, which may result in a reduction of a PIP score 114. By identifying new relevant groups and/or particular PIP activities associated with certain groups of individuals, tailored advice may be generated and presented for particular subsets of individuals. Tailored PIP content is discussed in more detail below with regard to FIG. 8.

Figure 2A:
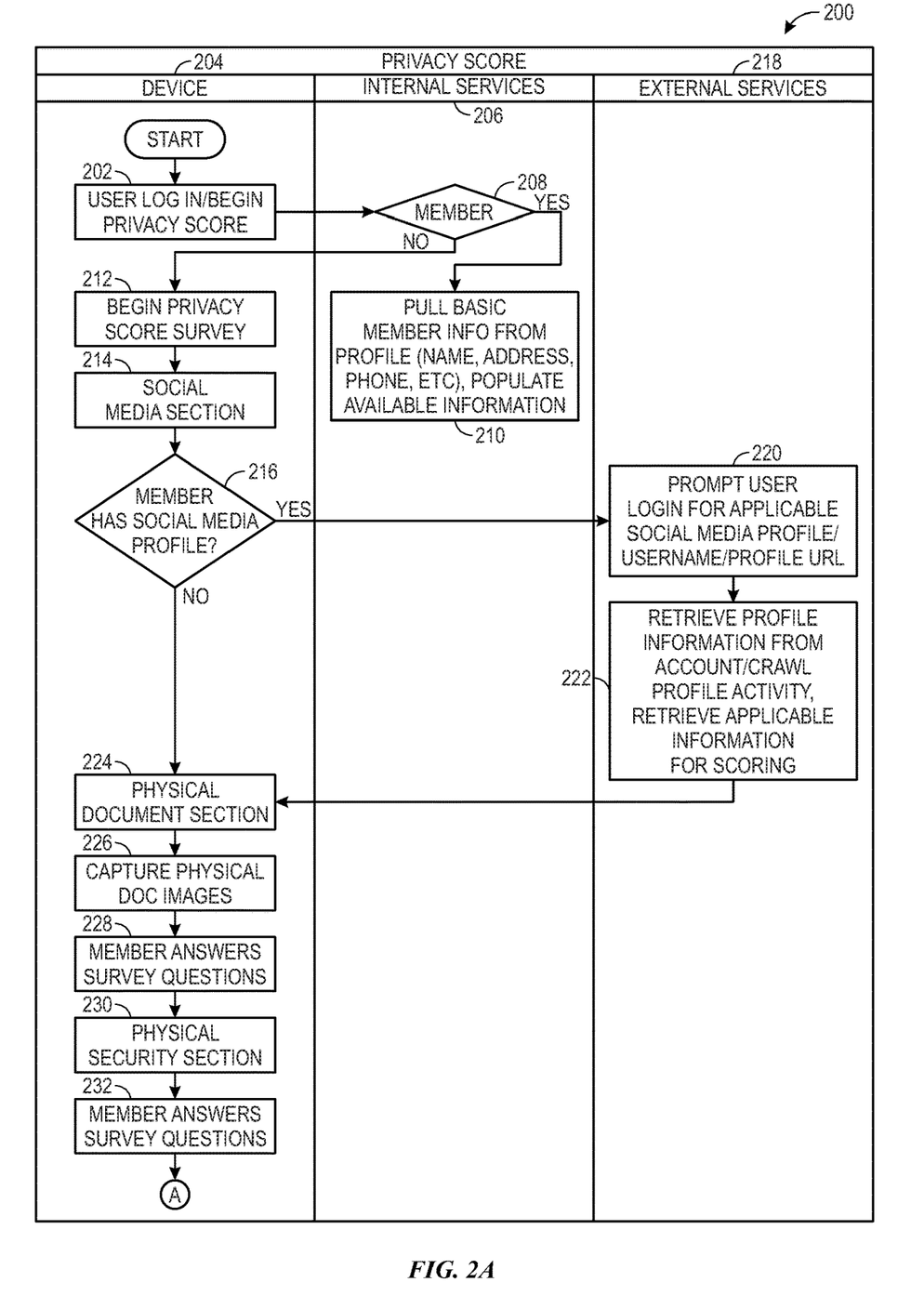
FIGS. 2A and 2B (collectively referred to as "FIG. 2" are a flowchart, illustrating a process for managing private information, in accordance with an embodiment of the present disclosure.
Figure 2B:
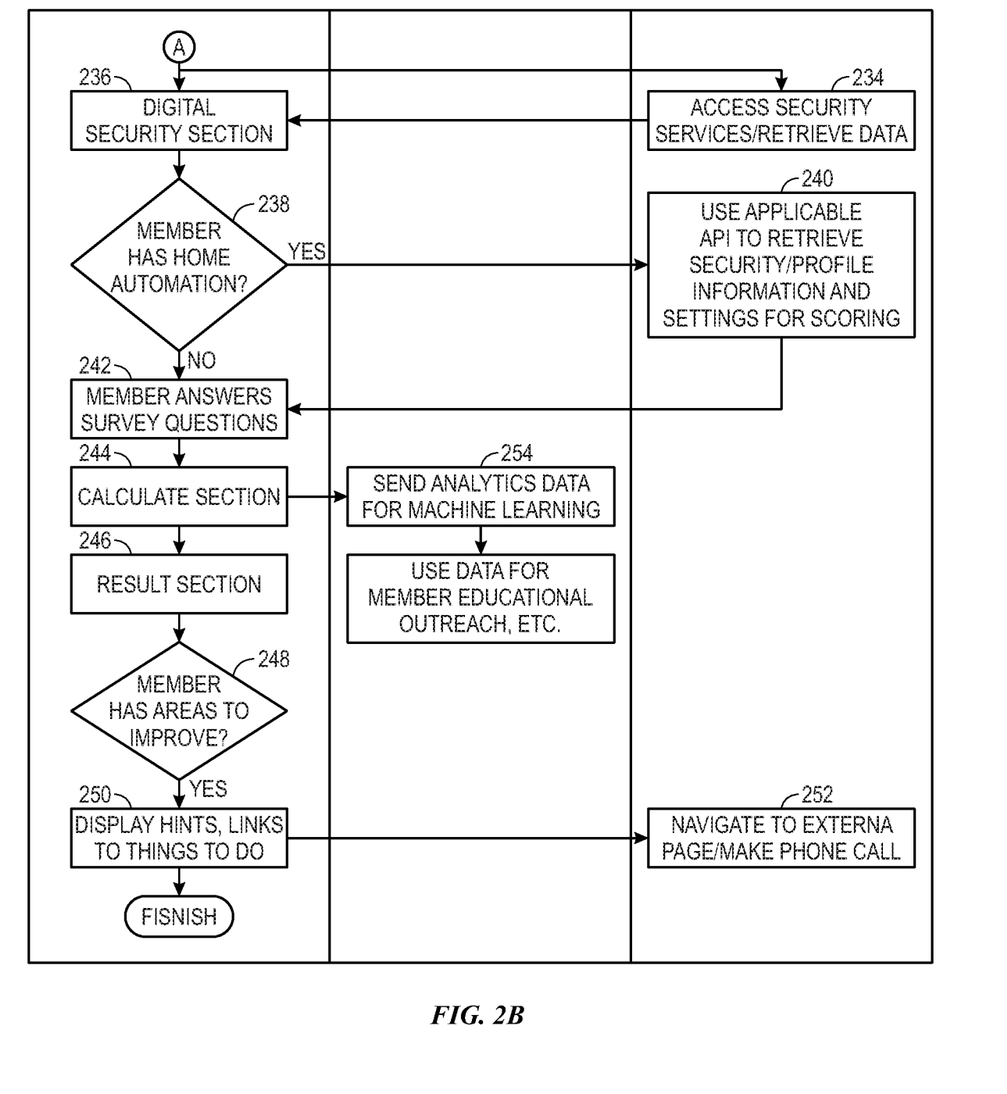

Turning now to functionality of the PIP service 102, FIG. 2 is a flowchart, illustrating a process 200 for managing private information, in accordance with an embodiment of the present disclosure. The process 200 begins by a user initiating and/or logging into to the private information scoring service (block 202). For example, the individual and/or group of individuals may access, via a device 204, a uniform resource locator (URL) of the PIP service 102, where the PIP scoring may commence.

The internal services 206 (e.g., the PIP service 104) may determine whether the individual and/or group of individuals is a member of the internal services (decision block 208). If the individual and/or group of individuals is a member, available information about the individual and/or group of individuals is gathered for use in the PIP analysis (block 210). The privacy scoring survey (e.g., the PIP analysis data gathering from relevant sources) may begin, with a baseline set of data including the gathered data from block 210 (block 212).

Otherwise, when the individual and/or group of individuals is not a member and no additional details regarding the individual and/or group of individuals is known by the internal services 206, the privacy score survey may begin without gathered baseline data (block 212).

The privacy score survey may include many different sections pertaining to different internal and/or external services. Data accumulated in each of the sections may be aggregated with data from the other sections to be used in determination of the overall private information protection score. In the current embodiment, a first section includes a social media section 214 for collecting/analyzing private information protection pertaining social media services 110.

As a preliminary matter in the social media section 214, the device may identify whether the individual and/or group of individuals has one or more social media profiles (decision block 216). This may be done in a number of ways. For example, the device 204 may poll for installed applications on the device 204 and determine if any social media service 110 applications are installed. If there are social media service 110 applications installed, the device 204 may access the social media service 110 applications to identify whether the individual and/or group of individuals is logged into a social media profile. If so, the device 204 can determine that the individual and/or group of individuals does have a social media profile and can identify a unique identifier associated with the social media profile. In some embodiments, the device 204 may provide a graphical user interface (GUI) prompting the individual and/or group of individuals to indicate whether they have a social media profile. The response to this prompt may provide an indication to the device 204 as to whether the individual and/or group of individuals has a social media profile.

When the individual and/or group of individuals has at least one social media profile, the user may be prompted to log in to the social media services 110 (which are external services 218) or otherwise provide access to social media services 110 (block 220). For example, open authorization (OAuth) access may be used between the social media services 110 and the PIP services 102. Once provided access, the internal services 206 may retrieve from the social media services 110, account information, profile activity, etc. that may be useful for the PIP analysis (block 222). For example, as may be appreciated, information regarding posted data and who the data is posted to may be very useful for the PIP analysis, as sharing certain types of identifying information with unfamiliar people could result in less private information protection. Further additional profile information, which may be obtained from social media services 110 APIs may include security/privacy settings, etc. When such information is available, the PIP service 102 may determine a level of protection regardless of historical posting of data.

In some embodiments, it may be enough to provide a unique identifier for the social media profile without providing access to personal social media services 110 for the individual and/or group of individuals. For example, when looking for historical post data for public (e.g., non-specified) viewers of the social media services 110, the PIP services 110 may simply reference the profile using the unique identifier as a public viewer. Once accessed, the PIP service 102 may crawl through posts and other data of the profile to ascertain information that is not protected from public view.

Figure 3A:
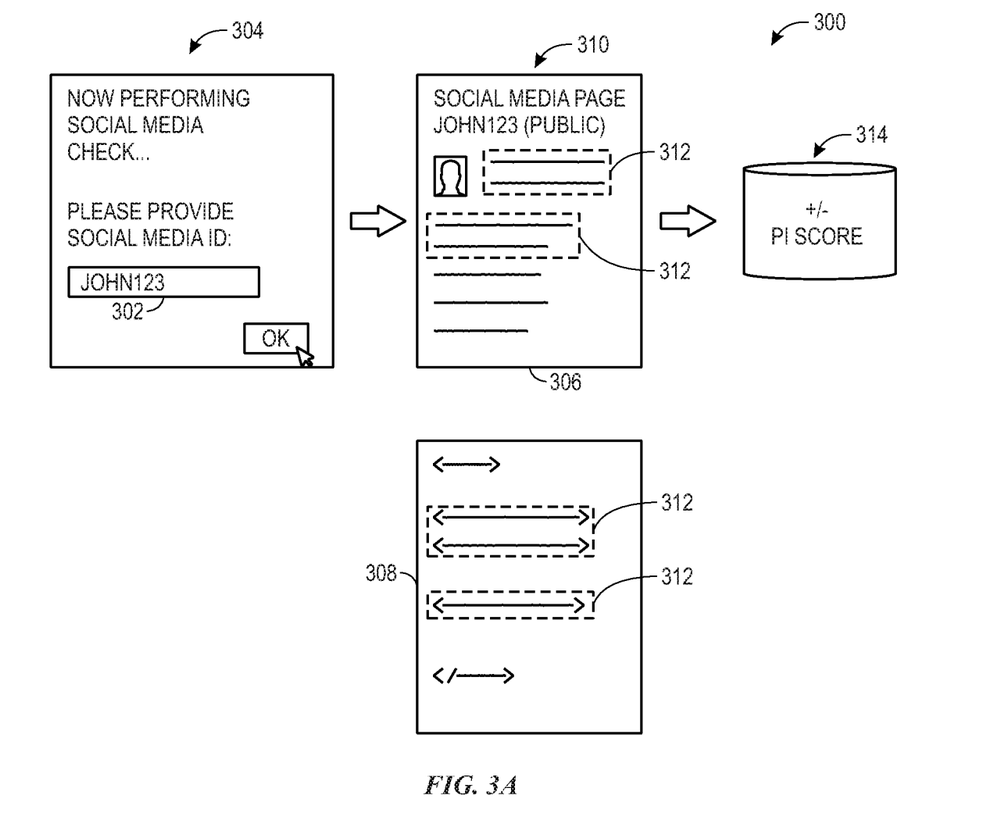
FIGS. 3A and 3B are schematic diagrams, illustrating performance of a private information analysis for social media services, in accordance with embodiments of the present disclosure.
Figure 3B:
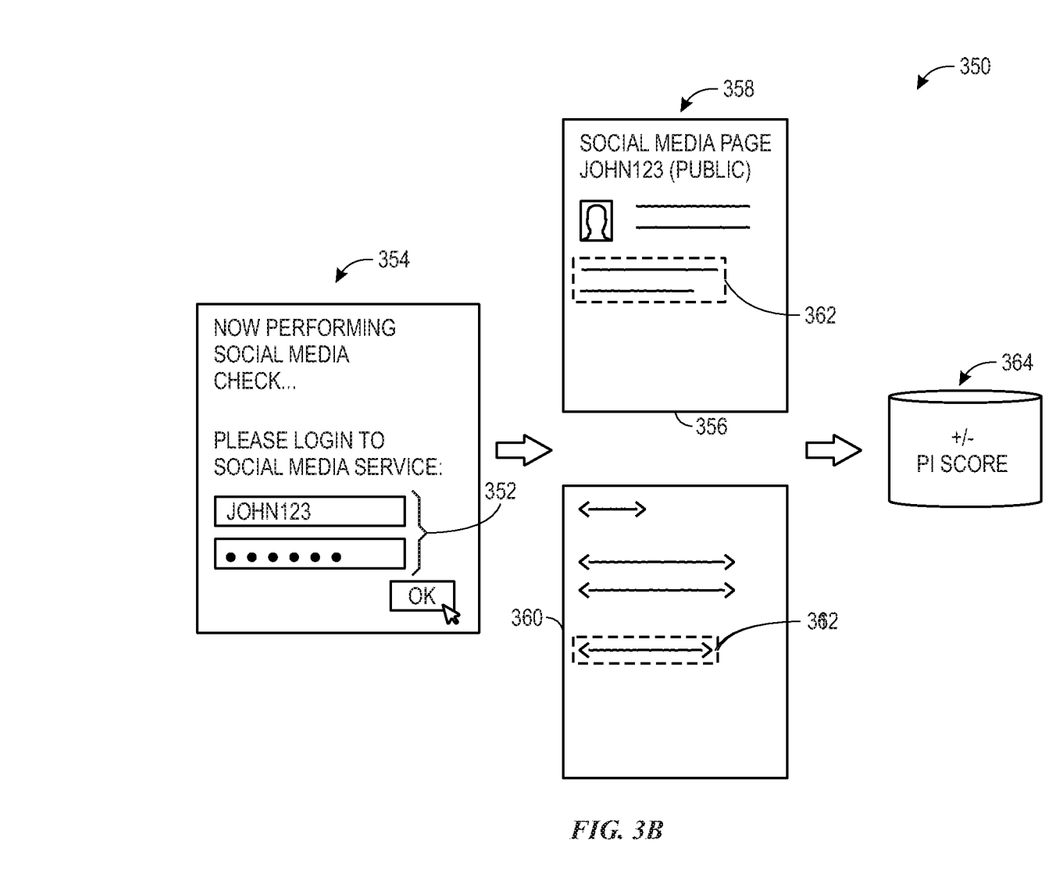

FIGS. 3A and 3B are schematic diagrams, illustrating performance of a private information analysis for social media services 110, in accordance with embodiments of the present disclosure. FIG. 3A illustrates an embodiment that uses a public view 300 for gathering social media services 110 data and FIG. 3B uses a limited view 350 to gather data. In FIG. 3A, the individual provides a social media unique identifier 302 as "JOHN123" in progression 304.

Upon receiving the unique identifier associated with the social media profile, the PIP services 102 may access the social media page view 306 or underlying code 308 of the social media page view 306 that is associated with the unique identifier 302. This is illustrated in progression 310. The PIP service 102 may crawl either the social media page view 306 or the underlying code 308 for private information. As illustrated in progression 310, two pieces of private information 312 (e.g., a full legal name, birthday, or other identifying information) are identified in progression 310. In progression 314, the privacy information score may be adjusted based upon the type and/or amount of private information that is available in public view. For example, private information protection scores may be reduced with an increasing magnitude based upon weights associated with different types of data. For example, social security numbers, which may be more difficult to obtain and are oftentimes treated as protective identifiers, may be weighted heavier than birthdates. Further, full legal names may be weighted less than birthdays, as they are more easily attainable than birthdays and are not often relied upon for security measures.

In some instances, the profile can be crawled for text associated with known private information. Further, in some embodiments, image recognition can be used to identify pictures or video with potential private information protection concerns. In some embodiments, to do this, the PIP service 102 may identify known private information and mine for posted content associated with the known private information. For example, if the PIP services 102 know that that an individual has listed his mother's maiden name as an answer to a security question on a website, the PIP services 102 may crawl for disclosure of his mother's maiden name on the social media services 110. The same technique may be used for other digital content. If, for example, the individual indicated that his favorite sport is tennis on a security question, the PIP services 102 could analyzed posted images, video, and/or audio for content that discloses the individual's enjoyment of tennis (e.g., a tennis highlights video posted to social media, a picture of the individual playing tennis, and/or a posted podcast related to tennis, etc.). The private information protection score may be modified based upon the presence or lack of presence of such content.

In some embodiments, the PIP service 102 may identify an accuracy of disclosed information and factor that into the private information protection score. For example, if a birthday is disclosed, but is not the individual's actual birthday, this may be treated as non-disclosure of the individual's birthday and/or may be treated as a protection precaution that actually increases the individual's private information protection score.

In FIG. 3B, the individual logs in to the social media profile using login information 352, as illustrated in progression 354. Upon logging in, the PIP service 102 may have access (e.g., via the social media services' 110 APIs) to limited views 356, which can only be accessed by specific groups of people (e.g., social media "friends"). As may be appreciated, with limited access, certain information may become less sensitive, while certain other information remains sensitive. For example, disclosure of a birthday to "friends" may not be sensitive, but social security number disclosure may still be sensitive. Accordingly, the PIP service 102 may identify potentially sensitive data based upon a context of who has access to the disclosure.

As discussed with FIG. 3A and illustrated in progression 358, the PIP services 102 may crawl either a page view 356 or the underlying code 360. Because the limited view 356 and underlying code 360 has a more limited audience than the view 306 and underlying code 308 in FIG. 3A, some private data may not be marked as sensitive in progression 358. For example, while two pieces of sensitive data were identified in FIG. 3A, only one piece of sensitive data 362 is identified in FIG. 3B. The private information protection score may be updated based upon the identified private information, as illustrated in progression 364.

Figure 4A:
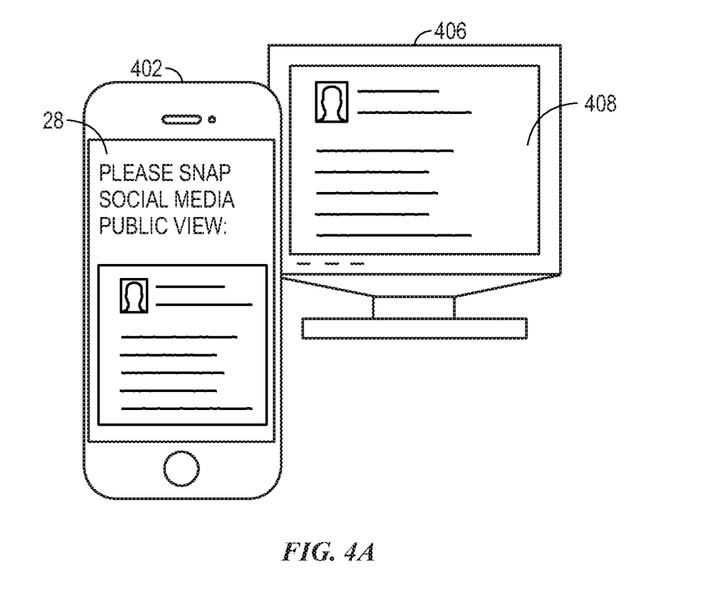
FIGS. 4A and 4B are schematic diagrams, illustrating usage of an image capture device to capture relevant data for a private information analysis, in accordance with an embodiment of the present disclosure.

In some embodiments, the PIP service application 112 may be used to obtain a view of the social media profile view. For example, in FIG. 4A, a device 402 may prompt 404 for a snapshot of a social media view (e.g., either public or limited). A camera of the device 402 may be positioned to take a snapshot of electronic display 406, which is displaying the requested social media view 408. Upon capturing the snapshot, the PIP service application 112 may provide the snapshot to the PIP service 102, where the PIP service 102 can use optical character recognition (OCR) and/or image recognition techniques to analyze the view 408 for disclosed private information, as discussed above.

Having discussed the social media section 214, the discussion now turns to a physical document section 224 in FIG. 2. The physical documents section relates to protection of data found on tangible documents, such as postal mail, etc. In some embodiments, data related to physical documents may be captured using the PIP service application 112 of FIG. 1. For example physical document images may be captured in block 226.

Figure 4B:
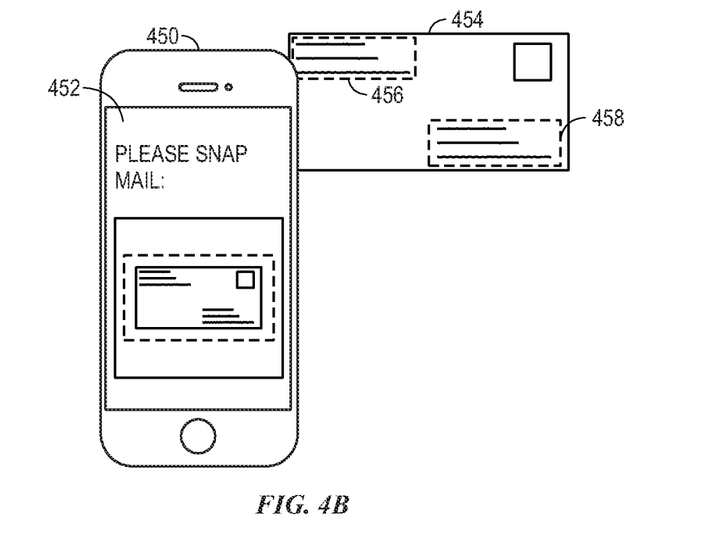

FIG. 4B is a schematic diagram, illustrating usage of an image capture device (e.g., a camera) of an electronic device 450 to capture relevant data for a private information analysis, in accordance with an embodiment of the present disclosure. In FIG. 4B, the PIP service application 112, running on the electronic device 450 provides a prompt 452 requesting a snapshot of physical mail 454. Attributes of the physical mail 454 may be recognized (e.g., via optical character recognition (OCR)) to scan for pertinent private information analysis data. For example, in the current embodiment, the sender information 456 as well as the recipient information 458 is captured. The sender information 456 may be used to identify predatory solicitors and other bad actors who may be attempting for defraud an individual. For example, the sender information 456 may be compared against a database that includes a list of addresses, entities, etc. that are known to practice predatory business practices. Accordingly, when such a sender is detected in the sender information 456, the individual can be notified of the bad actor status of the sender, in an effort to reduce fraudulent activity. Further, the recipient information may be useful to understand whether certain private information is already out in the public. For example, a generic recipient, such as "Head of Household" may indicate that the sender does not have access to the individual's full legal name, whereas a specific recipient, such as "John A. Smith" may indicate that the send already has the individual's full legal name. This information may be used in the private information protection score and may result in a notification to the individual.

Figure 5:
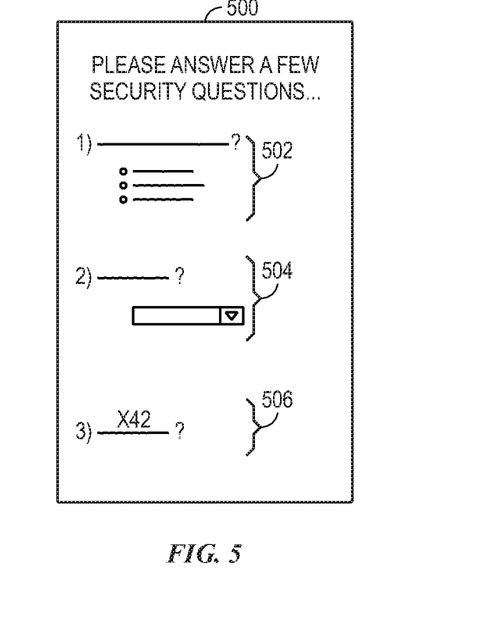
FIG. 5 is a schematic diagram, illustrating a survey for obtaining relevant information for a private information analysis, in accordance with an embodiment of the present disclosure.

Returning to FIG. 2, additionally and/or alternatively, survey questions may be answered related to physical documents (block 228). FIG. 5 is a schematic diagram, illustrating a GUI 500 that presents survey for obtaining relevant information for a private information analysis, in accordance with an embodiment of the present disclosure. As illustrated in FIG. 5, the survey may include questions to be answered via a list of options 502, questions to be answered via drop down options 504, questions to be answered with freeform text 506, or any combination thereof. The questions for the survey in this section relate to physical document procedures followed by the individual or group of individuals. For example, questions may relate to the types of physical documents that are retained, the period of retention, how they are disposed of, etc. In this section, the survey questions may look to see that the individual or group of individuals is properly retaining certain documents with proper security (e.g., out of public access, such as in a lock box, etc.) and that disposed of documents are disposed of in a secure manner (e.g., shredding documents with sensitive data rather than merely throwing the documents in the trash).

Figure 6:
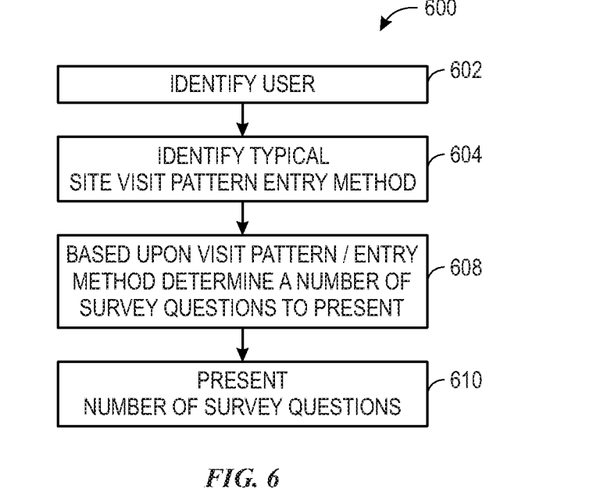
FIG. 6 is a flowchart, illustrating a process for providing a piecemeal survey based upon usage of an electronic website, in accordance with an embodiment of the present disclosure.

In some embodiments, it may be desirable to do a more piecemeal survey, not asking all questions at once, as answering a significant number of questions may seem like a daunting task or may at the least be an undesirable user experience. FIG. 6 is a flowchart, illustrating a process 600 for providing a piecemeal survey based upon usage of an electronic website, in accordance with an embodiment of the present disclosure. The process 600 begins by identifying the individual user (block 602). For example, this can be done when the user logs into the PIP service 102 website.

Next, a typical site usage pattern and/or entry method to the PIP service 102 website may be determined (block 604). For example, the usage pattern might include looking at a number of times the individual has accessed the website in the past, a frequency that the user has accessed the website in the past, etc. Such a pattern may provide an indication of how likely the individual is to return in the future to answer additional questions, which may impact the number of questions currently offered. Further, the entry method to the website may also be used to decide how many questions to offer. For example, if the individual directly accessed the survey, this may indicate the individual is prepared to answer more questions in the survey. In contrast, if the survey questions are indirectly provided to the user (e.g., the individual is on a car-loan site and is presented survey options related to private information protection), this may indicate that the individual may be less likely to be prepared to answer a significant number of survey questions.

Based upon the usage pattern and/or entry method, a number of survey questions to present may be determined (block 608). For example, as mentioned above, high frequency of visits or extensive past usage may indicate that fewer questions can be asked up front, as the individual is likely to return to the website and can answer more questions the next time they log in. On the other hand, less frequent users may be given larger numbers of questions, as it may be unclear whether these users will return to the site to answer additional survey questions in the future. Likewise, if a direct entry method is used to access the survey questions, the individual may receive more survey question than individuals that indirectly access survey questions (e.g., as a secondary topic of exploration on the website).

Once the number of survey questions to present is determined, the number of survey questions are presented to the individual (block 610). For example, this might result in the GUI 500 of FIG. 5 implemented above, as described in FIG. 6.

Returning to FIG. 2, the private information protection analysis may continue with a physical security section 230. Physical security, as used herein, refers to security of tangible items, such as cars, houses, etc. The physical security section 230 may include capturing data from individuals answering survey questions (block 232), as discussed above. The questions for this section may include information regarding physical security, such as whether cars and houses associated with the individual have alarms, whether those alarms are actively used, and whether the alarms include a monitoring service. Many physical security services now include online services that may track security over the Internet. Accordingly, the process 200 may also include accessing security services and retrieving relevant data from these services (block 234). For example, online camera monitoring services may confirm a number of cameras used at a particular location. This information may be accessed via APIs of the service providers. Once the physical security data gathering is complete, the private data protection score may be updated according to the data. For example, the use of physical security systems may increase the score, while lack of use of such systems may reduce the score.

The process 200 may include a digital security section 236. In the digital security section 236, the service analyzes data flowing to and from digital devices, such as IOT devices. First, a determination is made as to whether the individual is using home automation or other IOT services (decision block 238). If so, the service uses applicable APIs to retrieve security/profile information and settings for the relevant devices, which may be used in scoring (block 240). For example, information that may be retrieved may include what services the IOT device data is shared with, the types of data that are captured, etc.

After this information is collected (or the individual does not have home automation or other IOT services), survey questions pertaining to digital security may be asked and answered by the individual (block 242). This may occur in a similar manner as discussed above with regard to FIGS. 5 and 6.

Once data capture has occurred for all relevant sections, the overall score calculation may occur (block 244). As described above, upon completion of each section, an aggregated score may be updated based upon data of that section. Alternatively, a single score may be calculated at the end of all of the data capture based upon an aggregation of the collected data.

Figure 7:
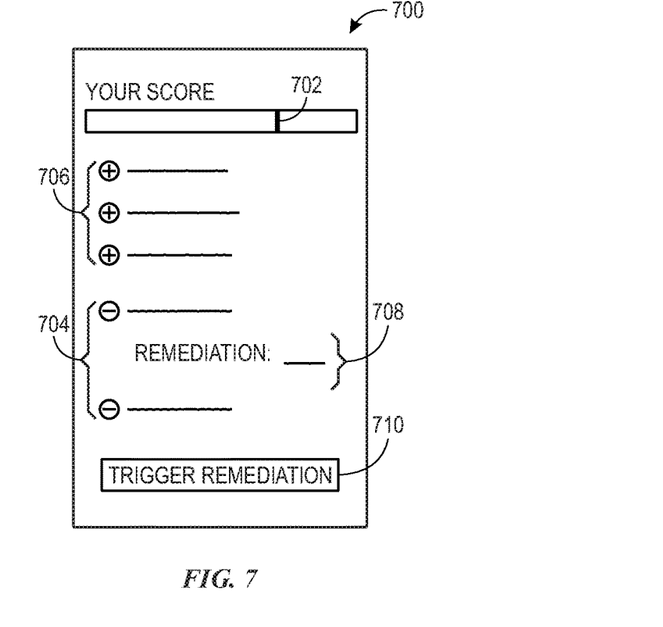
FIG. 7 is a schematic diagram, illustrating a private data score analysis results graphical user interface (GUI), in accordance with an embodiment of the present disclosure.

Upon completion of the calculated score, the results section may be initiated (block 246). The calculated score may be presented to the individual, as illustrated by the the scoring bar 702 of GUI 700 of FIG. 7.

Further, areas of improvement may be identified from the negative impacting data items that were captured during the analysis (block 248). These are illustrated as negative points 704 in FIG. 7. Further, hints, positive points 706 to continue doing, etc. may also be provided in the GUI 700 (block 250). Remediation advice 708 and/or links 710 to trigger remediation or remediation instructions may also be provided. The links 710 may result in navigating the individual to an external page, make a phone call to a relevant remediation service, etc. (block 252).

Figure 8:
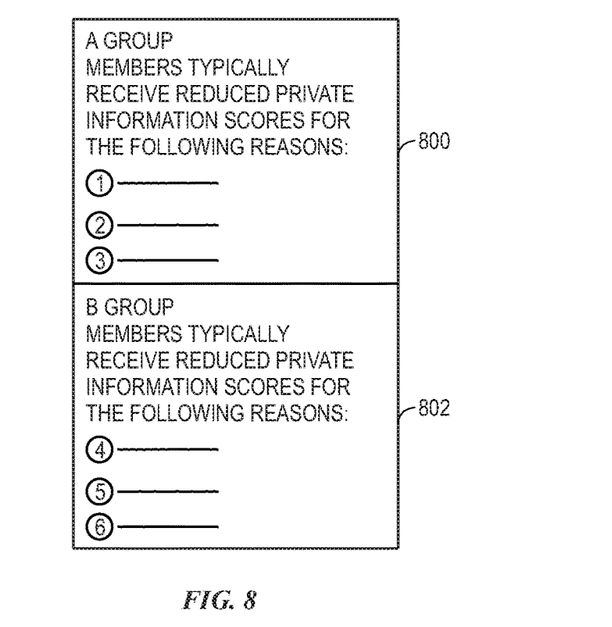
FIG. 8 is a schematic diagram, illustrating a generalized advice graphical user interface (GUI) that is impacted based upon learning particular vulnerabilities through private data analysis, in accordance with embodiments of the present disclosure.

In addition, analytics data may be sent for machine learning (block 254). For example, as discussed above, groups of individual with particular private information protection concerns may be identified by using machine learning. Thus, tailored information may be provided to particular groups of individuals, as illustrated in FIG. 8. In FIG. 8, two dialog boxes 800 and 802 are presented to particular relevant groups of individuals. In this example, the machine learning algorithms were used to identify that "A Group" members typically have protection issues centered around a list of factors 1, 2, and 3, which is presented to members of the "A Group" when they seek out advice for private information protection. In contrast, the machine learning algorithms have detected that the list of factors 4, 5, and 6 are particularly relevant to "B Group" members. Accordingly, when a "B Group" members seeks out the same advice as the "A Group" member, the "B Group" member will receive dialog box 802 instead of dialog box 800. As may be appreciated, this may result in more beneficial content provided to targeted groups of individuals rather than a significant amount of generic advice that an individual may gloss over.

The systems and techniques provided herein provide significant value in a world were information is becoming increasingly valuable and easily attainable. By providing systems that proactively analyze, rate and provide remediation efforts for private information vulnerabilities, individual or groups of individuals may be less susceptible to fraudulent activities, such as identify theft, etc.

The invention claimed is:

1. A tangible, non-transitory, computer readable medium comprising instructions that when executed by one or more processors of the computer cause the computer to:
   receive a private information protection (PIP) scoring request pertaining to a particular user;
   generate a PIP score by:
      capturing social media data of the particular user, by:
         identifying a social media profile of the particular user;
         accessing a social media page associated with the social media profile; and
         crawling underlying code of the social media page to identify private information of the particular user that is available on the social media page;
      aggregating the private information of the particular user that is available on the social media page to a set of PIP factors used in a PIP analysis;
      capturing settings associated with one or more Internet of Things (IOT) devices from one or more service providers of the IOT devices, by requesting the settings via an application programming interface (API) of the one or more service providers;
      aggregating the settings to the set of PIP factors;
      analyzing the private information of the particular user that is available on the social media page and the settings aggregated to the set of PIP factors to determine a level of private information disclosure; and
      identifying the PIP score based upon the analyzing the private information and settings aggregated to the set of PIP factors;
   present the PIP score to a graphical user interface, indicating a level of private information protection;
   provide the set of PIP factors to a machine learning engine configured to:
      receive sets of PIP factors associated with a plurality of users, and
      perform a machine learning analysis on the received sets of PIP factors to identify a previously unknown private information sharing pattern common to a subset of two or more of the plurality of users, and based upon the identified private information sharing pattern common to the subset of the plurality of users, provide a tailored notification via a second graphical user interface to a member of the subset of the plurality of users, indicating the identified private information sharing pattern.

2. The non-transitory computer readable medium of claim 1, comprising instructions that when executed by the one or more processors cause the computer to:
capture the social media data by accessing and crawling underlying code of a public social media profile view of a social media service; and
identify the private information of the particular user that is available on the social media page in a context of the public social media profile view, wherein the context of the public social media profile view indicates different data as private information than a context of a private social media profile view.

3. The non-transitory computer readable medium of claim 1, comprising instructions that when executed by the one or more processors cause the computer to:
capture the social media data by accessing and crawling underlying code of a private social media profile view of a social media service; and
identify the private information of the particular user that is available on the social media page in a context of the private social media profile view, wherein the context of the private social media profile view indicates different data as private information than a context of a public social media profile view.

4. The non-transitory computer readable medium of claim 1, comprising instructions that when executed by the one or more processors cause the computer to:
capture additional social media data by prompting for, via a data capture graphical user interface, and receiving an image snapshot of a social media view;
performing optical character recognition (OCR) on the image snapshot of the social media view, and crawling text of results of the OCR for additional private information provided via the social media view.

5. The non-transitory computer readable medium of claim 1, comprising instructions that when executed by the one or more processors cause the computer to:
access a data store to identify known information about the particular user;
compare the identified private information of the particular user that is available on the social media page with the known information about the particular user to determine whether the private information of the particular user that is available on the social media page is accurate; and
adjust the PIP score based upon whether the private information of the particular user that is available on the social media page is accurate.

6. The non-transitory computer readable medium of claim 5, comprising instructions that when executed by the one or more processors cause the computer to:
negatively impact the PIP score when an accurate piece of personal information is disclosed to the public; and
otherwise, retain the PIP score or positively impact the PIP score when an inaccurate piece of personal information is disclosed to the public.

7. The non-transitory computer readable medium of claim 1, comprising instructions that when executed by the one or more processors cause the computer to:
identify a magnitude of an audience with which the social media page is shared;
weigh an adjustment to the PIP score based upon the magnitude of the audience of the social media page.

8. The non-transitory computer readable medium of claim 1, comprising instructions that when executed by the one or more processors cause the computer to:
capture and aggregate physical document data to the set of PIP factors by requesting, via a data capture graphical user interface, and receiving an image snapshot of physical documents;
performing optical character recognition (OCR) on the physical documents to derive text of the physical documents; and
identifying and aggregating factors of the derived text to the set of PIP factors.

9. The non-transitory computer readable medium of claim 8, comprising instructions that when executed by the one or more processors cause the computer to:
identify a sender of the physical document as one factor of the derived text;
query a database to identify that the sender of the physical document is in the database;
based upon the sender of the physical document being in the database, identify that the sender of the physical document is a predatory actor; and
provide an electronic notification that the sender of the physical document has been identified as a predatory actor.

10. The non-transitory computer readable medium of claim 1, comprising instructions that when executed by the one or more processors cause the computer to:
present with the PIP score, in the graphical user interface, a remediation affordance that, when selected, navigates the particular user to an external page to complete a remediation.

11. The non-transitory computer readable medium of claim 1, comprising instructions that when executed by the one or more processors cause the computer to:
present one or more survey questions via a graphical user interface (GUI); and
aggregate answers to the one or more survey questions to the set of PIP factors.

12. The non-transitory computer readable medium of claim 11, comprising instructions that when executed by the one or more processors cause the computer to:
identify a typical site usage pattern, a site entry point, or both for the particular user, who is to be presented the one or more survey questions;
based upon the typical site usage pattern, the site entry point, or both, determine a number of survey questions to present;
present only the number of survey questions, saving any remaining survey questions for a subsequent site visit.

13. The non-transitory computer readable medium of claim 1, comprising instructions that when executed by the one or more processors cause the computer to:
capture and aggregate physical security data regarding security associated with physical items of the particular user to the set of PIP factors.

14. A computer-implemented method, comprising:
receiving, via a computer, a private information protection (PIP) scoring request pertaining to a particular user;
generating, via the computer, a PIP score by:
capturing social media data of the particular user, by:
identifying a social media profile of the particular user;

accessing a social media page associated with the social media profile; and crawling underlying code of the social media page to identify private information of the particular user that is available on the social media page;

aggregating the private information of the particular user that is available on the social media page to a set of PIP factors used in a PIP analysis;

capturing settings associated with one or more Internet of Things (IOT) devices from one or more service providers of the IOT devices, by requesting the settings via an application programming interface (API) of the one or more service providers;

aggregating the settings to the set of PIP factors;

analyzing the private information of the particular user that is available on the social media page and the settings aggregated to the set of PIP factors to determine a level of private information disclosure; and identifying the PIP score based upon the analyzing the private information and settings aggregated to the set of PIP factors;

presenting, via the computer, the PIP score to a graphical user interface, indicating a level of private information protection;

providing the set of PIP factors to a machine learning engine configured to:
  receive sets of PIP factors associated with a plurality of users; and
  perform a machine learning analysis on the received sets of PIP factors to identify a previously unknown private information sharing pattern common to a subset of two or more of the plurality of users; and based upon the identified private information sharing pattern common to the subset of the plurality of users, providing a tailored notification via a second graphical user interface to a member of the subset of the plurality of users, indicating the identified private information sharing pattern.

15. The computer-implemented method of claim 14, comprising:
capturing the social media data by:
  accessing and crawling underlying code of a public social media profile view of a social media service and identifying the private information of the particular user that is available on the social media page in a context of the public social media profile view, wherein the context of the public social media profile view indicates different data as private information than a context of a private social media profile view; or
  accessing and crawling underlying code of the private social media profile view of the social media service and identifying the private information of the particular user that is available on the social media page in the context of the private social media profile view, wherein the context of the private social media profile view indicates different data as private information than the context of a public social media profile view; or
  both.

16. The computer-implemented method of claim 14, comprising:
accessing a data store to identify known information about the particular user;

comparing the identified private information of the particular user that is available on the social media page with the known information about the particular user to determine whether the private information of the particular user that is available on the social media page is accurate; and adjusting the PIP score based upon whether the private information of the particular user that is available on the social media page is accurate, by:
  negatively impacting the PIP score when an accurate piece of personal information is disclosed to the public;
  retaining the PIP score or positively impacting the PIP score when an inaccurate piece of personal information is disclosed to the public; or
  both.

17. The computer-implemented method of claim 14, comprising:
identifying a magnitude of an audience with which the social media page is shared;
weighing an adjustment to the PIP score based upon the magnitude of the audience of the social media page.

18. A system, comprising:
communications circuitry;
tangible, non-transitory, storage; and
one or more processors, configured to:
  receive, via the communications circuitry, a private information protection (PIP) scoring request pertaining to a particular user;
  generate a PIP score by:
    capturing storage social media data of the particular user, by:
      identifying a social media profile of the particular user;
      accessing a social media page associated with the social media profile; and
      crawling underlying code of the social media page to identify private information of the particular user that is available on the social media page;
    aggregating the private information of the particular user that is available on the social media page to a set of PIP factors used in a PIP analysis;
    capturing settings associated with one or more Internet of Things (IOT) devices both from one or more service providers of the IOT devices, by requesting the settings via an application programming interface (API) of the one or more service providers;
    aggregating the settings to the set of PIP factors;
    analyzing the private information of the particular user that is available on the social media page and the settings aggregated to the set of PIP factors to determine a level of private information disclosure; and
    identifying the PIP score based upon the analyzing the PIP factors;
  present the PIP score to a graphical user interface, indicating a level of private information protection;
  provide the set of PIP factors to a machine learning engine configured to:
    receive sets of PIP factors associated with a plurality of users; and
    perform a machine learning analysis on the received sets of PIP factors to identify a previously unknown private information sharing pattern common to a subset of two or more of the plurality of users; and
  based upon the identified private information sharing pattern common to the subset of the plurality of users, provide a tailored notification via a second graphical user interface to a member of the subset of the plurality of users, indicating the identified private information sharing pattern.

19. The system of claim 18, wherein the one or more processors are configured to capture the social media data by:

accessing and crawling underlying code of a public social media profile view of a social media service and identifying the private information of the particular user that is available on the social media page in a context of the public social media profile view, wherein the context of the public social media profile view indicates different data as private information than a context of a private social media profile view; or accessing and crawling underlying code of the private social media profile view of the social media service and identifying the private information of the particular user that is available on the social media page in the context of the private social media profile view, wherein the context of the private social media profile view indicates different data as private information than the context of a public social media profile view; or both.

20. The system of claim 18, wherein the one or more processors are configured to:

access a data store to identify known information about the particular user;

compare the identified private information of the particular user that is available on the social media page with the known information about the particular user to determine whether the private information of the particular user that is available on the social media page is accurate; and adjust the PIP score based upon whether the private information of the particular user that is available on the social media page is accurate, by:

negatively impacting the PIP score when an accurate piece of personal information is disclosed to the public;

retaining the PIP score or positively impacting the PIP score when an inaccurate piece of personal information is disclosed to the public; or both.

* * * * *